United States Patent [19]
Gondert et al.

[11] Patent Number: 4,573,730
[45] Date of Patent: Mar. 4, 1986

[54] DRAG REDUCING PARTIAL TONNEAU FOR PICKUP TRUCK

[75] Inventors: Theodore R. Gondert, Romeo; Richard A. MacDonald, Brighton, both of Mich.

[73] Assignee: General Motors Corporation, Detroit, Mich.

[21] Appl. No.: 610,692

[22] Filed: May 16, 1984

[51] Int. Cl.⁴ .......................................... B62D 35/00
[52] U.S. Cl. ................................. 296/1 S; 296/100
[58] Field of Search ............................ 296/1 S, 100

[56] References Cited
U.S. PATENT DOCUMENTS

| | | | |
|---|---|---|---|
| 4,072,336 | 2/1978 | Ruzicka | 296/1 S |
| 4,136,905 | 1/1979 | Morgan | 296/50 |
| 4,273,377 | 6/1981 | Alexander | 296/100 |
| 4,285,539 | 8/1981 | Cole | 296/100 |
| 4,318,565 | 3/1982 | Lay | 296/1 S |
| 4,372,601 | 2/1983 | Smith | 296/50 |
| 4,406,493 | 9/1983 | Albrecht et al. | 296/100 |
| 4,451,075 | 5/1984 | Canfield | 296/1 S |

Primary Examiner—Robert R. Song
Attorney, Agent, or Firm—Charles E. Leahy

[57] ABSTRACT

An aerodynamic drag reducing device for a pickup truck includes a tonneau cover which extends between the side walls of the pickup box and forwardly from the tailgate to a distance short of the passenger cab so that the tonneau cover encloses a rearward portion of the pickup box. Tonneau covers enclosing the rearward portion of the pickup box to a range of approximately 40 to 60% of the total length of the pickup box provide a greater reduction of aerodynamic drag coefficient than obtained with a tonneau cover enclosing the full length of the pickup box.

1 Claim, 2 Drawing Figures

REDUCTION IN AERODYNAMIC DRAG
FOR A PARTIAL TONNEAU

DRAG REDUCING PARTIAL TONNEAU FOR PICKUP TRUCK

The invention relates to an aerodynamic drag reduction device for a pickup truck and more particularly relates to the provision of a tonneau cover enclosing only the rearmost 40 to 60% of the total length of the pickup box.

BACKGROUND OF THE INVENTION

Various prior art devices have been provided to modify the pickup box in order to reduce the aerodynamic drag of the vehicle.

One such aerodynamic drag reducer is the use of a tonneau cover connstructed of canvas, wood or metal panels which extend between the side walls of the truck box from the tailgate to the passenger cab to completely enclose the pickup box. In addition to reducing the aerodynamic drag, these tonneau covers are useful to conceal and protect tools or other cargo which may be carried in the truck.

SUMMARY OF THE INVENTION

According to the present invention the tonneau cover spans the distance between the side walls of the pickup box and extends forwardly from the tailgate but stops some distance from the passenger cab so that a substantial forward portion of the cargo box remains open. By wind tunnel testing, we have discovered tha the drag reduction obtained with a tonneau cover enclosing only the rearmost 40 to 60% of the length of the pickup box exceeds the drag reduction obtained with a prior art full length tonneau cover. We have also found that the maximum drag reduction is achieved at a tonneau length of 50%. Furthermore, tests confirmed that the addition of a vertical wall at the leading edge of the 50% rear tonneau cover has only a small effect on the drag reduction obtained. Accordingly, with the 50% rear portion of the box covered by a tonneau and a vertical wall installed in the pickup box at the forward edge of the tonneau cover, the drag reducing partial tonneau cover device of this invention provides a useful pickup box configuration in which the front half of the box remains open to conveniently receive cargo and the rear half of the cargo box provides a tonneau enclosed storage compartment which is accessible through the conventional hinged tailgate to provide secure and weathertight cargo storage.

Thus, the object, feature and advantage of the present invention resides in the provision of a tonneau cover enclosing approximately the rear half of the pickup box to obtain maximum aerodynamic drag reduction.

A further object, feature and advantage of the invention resides in the provision of an aerodynamic drag reducing tonneau cover enclosing approximately the rear half of the pickup box and cooperating with a vertical bulkhead extending between the side walls at the leading edge of the tonneau and cooperating with the hinged tailgate to provide a secure cargo storage compartment accessible through the hinged tailgate.

BRIEF DESCRIPTION OF THE DRAWINGS

These and other features, objects and advantages of the invention will become apparent upon consideration of the specification in which.

DESCRIPTION OF THE PREFERRED EMBODIMENT

Figure 1:
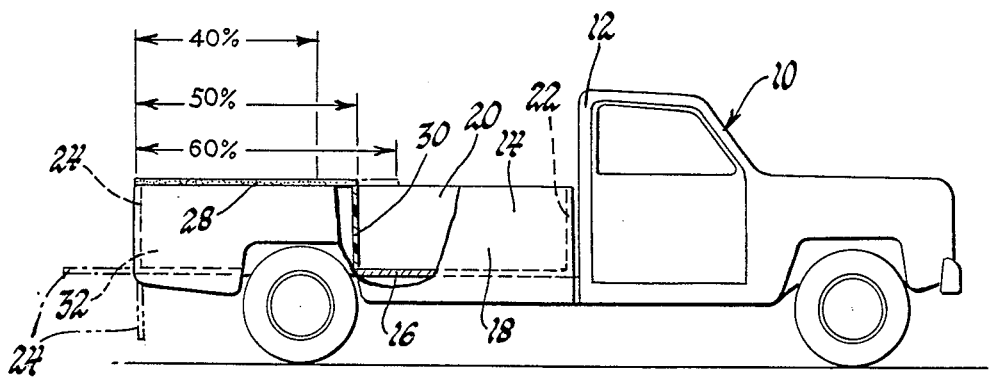
FIG. 1 is a side elevation view of a pickup truck having the drag reducing partial tonneau cover of the present invention.

Referring to FIG. 1, there is shown a side elevation view of a pickup truck 10 including a passenger cab 12 and a pickup box 14. The pickup box 14 includes a bed 16 supported on the vehicle chassis and a pair of laterally spaced apart side walls 18 and 20 which are joined together at their forward ends by a front wall 22 located adjacent the passenger cab 12. At the rear end of the side walls 18 and 20, a tailgate 24 is hingedly mounted for movement about its bottom edge between an upright position closing the rear end of the box 14, a phantom line indicated horizontal position, and a phantom line indicated vertically depending position.

According to the present invention, a tonneau cover 28 extends between the side walls 18 and 20 and forwardly from the tailgate 24 but stops short of the front wall 22. The tonneau cover may be constructed of canvas, wood, metal, fiberglass, or other suitable material.

Figure 2:
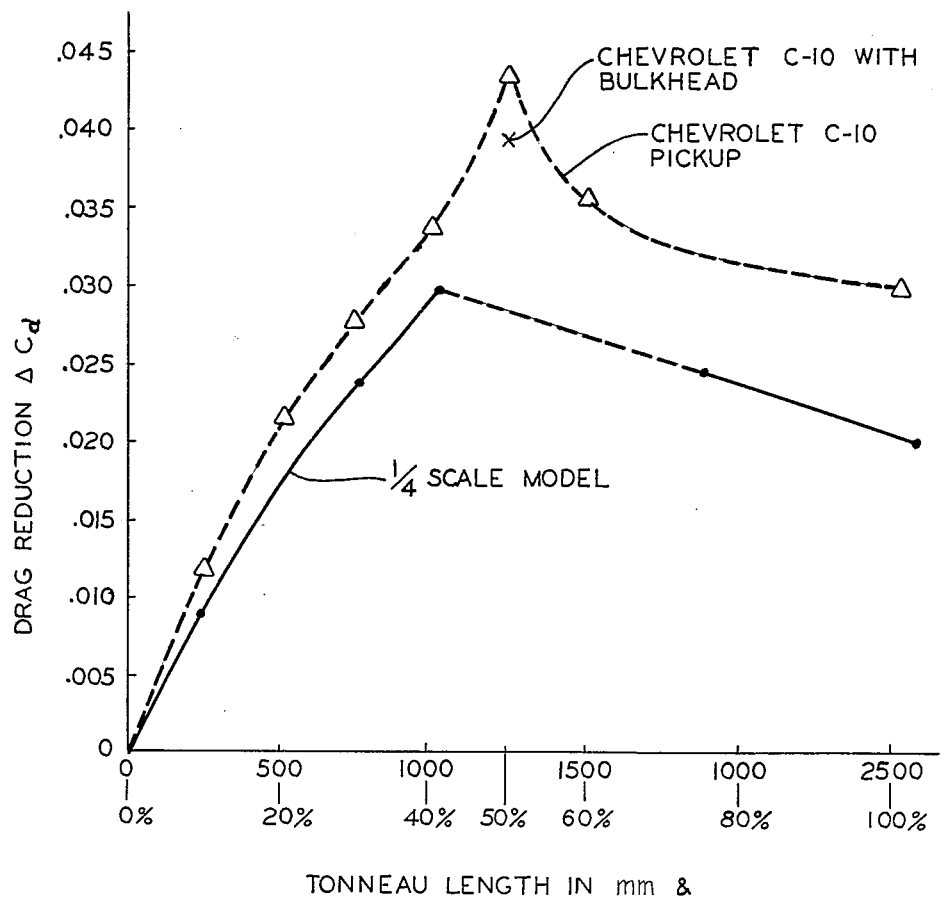
FIG. 2 is a plot of drag reduction versus the tonneau length from the rear of the pickup box.

Referring to FIG. 2, there is shown the results of wind tunnel testing of a 1982 Chevrolet pickup truck, Model C-10, which has a pickup box 2500 mm in length. Initial testing was conducted using a one-quarter scale model of the truck and it was observed that a partial tonneau cover extending 40% of the distance from the rear of the pickup box achieved a greater reduction in drag coefficient than a full tonneau cover extending 100% of the distance from the tailgate to the passenger cab.

Tests with a full size Chevrolet C-10 pickup truck indicated that the drag coefficient of the truck with a full tonneau cover was 0.030 less than a truck with no tonneau cover at all. However tonneau lengths of only 40% and 60% provided greater drag coefficient reductions of 0.034 and 0.036, respectively. The maximum reduction in drag coefficient was obtained at a 50% tonneau length. These tests were conducted with the tailgate in the upright closed position and without any closure of the pickup box at the leading edge of the tonneau cover so that the covered rear portion of the pickup box remained in open air communication with the uncovered forward portion of the pickup box.

Referring to FIG. 1, it is seen that a vertical front wall or bulkhead 30 may be installed between the side walls 18 and 20 to close the space between the bed 16 and the leading edge of the tonneau cover 28. Accordingly, the tonneau cover 28 and the bulkhead 30 cooperate with the bed 16 to define a closed cargo compartment 32 at the rear half of the pickup box which is accessible when the tailgate 24 is lowered to either of the phantom line indicated open positions. Thus, a closed cargo compartment 32 is conveniently provided for secure weathertight storage while the forward half of the pickup box remains open for convenient cargo storage therein.

Referring again to FIG. 2, a wind tunnel test was conducted with the 50% length of the tonneau cover 28 and a forward bulkhead 30. Although the drag coefficient reduction of 0.039 indicated is somewhat less than the 0.044 drag coefficient reduction without the bulkhead 30, the drag reduction remains greater than the drag reduction provided with a 100% tonneau length.

It will be understood that, in its preferred form, the invention is practiced with a removable tonneau cover 28 and a bulkhead 30 which may also be removed to restore the pickup box to its traditional full open length by which oversize cargo may be hauled. It follows then that the tonneau cover 28 and the bulkhead 30 would be reinstalled to optimize drag reduction and fuel economy whenever permitted by the intended use of the pickup vehicle.

Thus it is seen that the invention provides a new and improved drag reduction device for a pickup vehicle by achieving optimum aerodynamic drag reduction through the use of a tonneau cover enclosing only the rear half of the pickup box. Furthermore it is understood that the use of the 50% tonneau cover in conjunction with a vertical bulkhead installed mid-length in the pickup box at the leading edge of the tonneau cover provides a secure cargo compartment accessible through the tailgate while the front half of the pickup box remains open to receive cargo hoisted over the side wall.

It will be understood that the wind tunnel test results disclosed herein are pertinent to the selection of the length of a partial tonneau cover for the Chevrolet C-10 pickup truck. In other pickup truck models, the relative length and shape of the cab and box will vary from the C-10 Chevrolet pickup truck and the optimum length of the partial tonneau cover can best be found by the use of wind tunnel testing.

The embodiments of the invention in which an exclusive property or privilege is claimed are defined as follows:

1. In an aerodynamic drag reducing device for a pickup truck having a pickup box defined by a bed, a front wall adjacent the passenger cab, spaced apart side walls, and a tailgate, said drag reducing device comprising: a tonneau cover extending between the side walls and forwardly from the tailgate to a distance short of the passenger cab, said tonneau cover cooperating with the side walls and the bed to define an open front storage compartment accessible through either the tailgate or the open front thereof, and said tonneau cover having a length to cover only the rearmost 40–60% of the total length of the pickup box, whereby the aerodynamic drag of the pickup truck is reduced to an extent greater than the drag reduction obtained by a partial tonneau cover of length greater or lesser than the rearmost 40–60% of the total length of the pickup box.

* * * * *